(12) United States Patent
Kinoshita

(10) Patent No.: US 10,538,614 B2
(45) Date of Patent: Jan. 21, 2020

(54) COMPOSITION FOR FORMING SEMI-RIGID POLYURETHANE FOAM

(71) Applicant: SANYO CHEMICAL INDUSTRIES, LTD., Kyoto-shi, Kyoto (JP)

(72) Inventor: Shunsuke Kinoshita, Kyoto (JP)

(73) Assignee: SANYO CHEMICAL INDUSTRIES, LTD., Kyoto-shi (JP)

( * ) Notice: Subject to any disclaimer, the term of this patent is extended or adjusted under 35 U.S.C. 154(b) by 67 days.

(21) Appl. No.: 15/105,134

(22) PCT Filed: Dec. 16, 2014

(86) PCT No.: PCT/JP2014/006250
§ 371 (c)(1),
(2) Date: Jun. 16, 2016

(87) PCT Pub. No.: WO2015/098035
PCT Pub. Date: Jul. 2, 2015

(65) Prior Publication Data
US 2016/0311962 A1    Oct. 27, 2016

(30) Foreign Application Priority Data
Dec. 24, 2013 (JP) ................ 2013-265081

(51) Int. Cl.
| C08G 18/16 | (2006.01) |
| C08G 18/18 | (2006.01) |
| C08G 18/32 | (2006.01) |
| C08G 18/40 | (2006.01) |
| C08G 18/48 | (2006.01) |
| C08G 18/63 | (2006.01) |
| C08G 18/66 | (2006.01) |
| C08G 18/76 | (2006.01) |
| C08G 101/00 | (2006.01) |

(52) U.S. Cl.
CPC ....... *C08G 18/4816* (2013.01); *C08G 18/161* (2013.01); *C08G 18/18* (2013.01); *C08G 18/1808* (2013.01); *C08G 18/1833* (2013.01); *C08G 18/3281* (2013.01); *C08G 18/4072* (2013.01); *C08G 18/485* (2013.01); *C08G 18/4841* (2013.01); *C08G 18/632* (2013.01); *C08G 18/6688* (2013.01); *C08G 18/7664* (2013.01); *C08G 18/7671* (2013.01); *C08G 18/3271* (2013.01); *C08G 18/3278* (2013.01); *C08G 2101/005* (2013.01); *C08G 2101/0016* (2013.01)

(58) Field of Classification Search
CPC ........... C08G 18/485; C08G 18/635; C08G 18/4841; C08G 2101/0016; C08G 18/3271; C08G 18/3278; C08G 18/3281; C08G 18/4072; C08G 18/4816; C08G 18/632
See application file for complete search history.

(56) References Cited

U.S. PATENT DOCUMENTS

| 5,308,885 A * | 5/1994 | Doerge .................. C08J 9/144 521/128 |
| 2003/0124333 A1 | 7/2003 | Itaba |
| 2004/0038042 A1 | 2/2004 | Stadler et al. |
| 2007/0067994 A1 | 3/2007 | Cowelchuk et al. |
| 2010/0210768 A1 | 8/2010 | Tsuji et al. |
| 2013/0209778 A1 | 8/2013 | Albach et al. |
| 2014/0066536 A1* | 3/2014 | Adkins ................ C08F 283/06 521/163 |
| 2014/0094534 A1 | 4/2014 | Buckley et al. |
| 2016/0318285 A1* | 11/2016 | Kinoshita .......... C08G 18/4841 |

FOREIGN PATENT DOCUMENTS

| CN | 102796239 A | 11/2012 |
| JP | 58-179220 A | 10/1983 |
| JP | 3-199222 A | 8/1991 |
| JP | H3-199222 A | 8/1991 |
| JP | 4-146916 A | 5/1992 |
| JP | 2000-334843 A | 12/2000 |
| JP | 2001-354746 A | 12/2001 |
| JP | 2002-240593 A | 8/2002 |
| JP | 2004-75701 A | 3/2004 |
| JP | 2005-14370 A | 1/2005 |
| JP | 2005-14589 A | 1/2005 |
| JP | 2005-48023 A | 2/2005 |
| JP | 2005-88306 A | 4/2005 |
| JP | 2006-305916 A | 11/2006 |
| JP | 2007-16107 A | 1/2007 |
| JP | 2007-211071 A | 8/2007 |
| JP | 2011-21073 A | 2/2011 |

OTHER PUBLICATIONS

International Search Report dated Apr. 7, 2015, issued in counterpart International Application No. PCT/JP2014/006250 (2 pages).
Japanese translation of Chinese Office Action dated Nov. 23, 2017, issued in Chinese Patent Application No. 201480070181.3.
Final Office Action dated Nov. 19, 2018, issued in U.S. Appl. No. 15/104,451 (18 pages).
Non-Final Office Action dated Mar. 22, 2018, issued in U.S. Appl. No. 15/104,451 (24 pages).
Restriction Requirement dated Dec. 26, 2017, issued in U.S. Appl. No. 15/104,451 (8 pages).
International Search Report dated Mar. 17, 2015, issued in application No. PCT/JP2014/006251 (counterpart to U.S. Appl. No. 15/104,451:) (2 pages).

* cited by examiner

*Primary Examiner* — Melissa A Rioja
(74) *Attorney, Agent, or Firm* — Westerman, Hattori, Daniels & Adrian, LLP

(57) ABSTRACT

The purpose of the present invention is to provide a composition for forming a semi-rigid polyurethane foam that has low hardness and a resilient feel, has excellent moldability and curability even when made lightweight (made thin), and is suitable for use as an automobile interior material. The present invention is a composition for forming a semi-rigid polyurethane foam that comprises: a polyol mixture (P) that contains a specific polyol (the composition) (A), a water-containing foaming agent (C), and a catalyst (D); and a polyisocyanate component (B). The content of foaming agent (C) is 1.5-2.5 wt % based on the total weight of (A).

7 Claims, No Drawings

COMPOSITION FOR FORMING SEMI-RIGID POLYURETHANE FOAM

TECHNICAL FIELD

The present invention relates to a composition for forming a semi-rigid polyurethane foam, more specifically to a composition for forming a semi-rigid polyurethane foam which is suitable as an interior material such as a crash pad for a vehicle instrument panel.

BACKGROUND ART

Heretofore, a semi-rigid polyurethane foam has been widely used as an interior member such as a crash pad for an instrument panel for automobiles and the like, because of its extremely superior properties for use as an impact absorption body. Most of pad materials for instrument panels are generally produced by a method in which a skin made from urethane or polyvinyl chloride and a base made from polypropylene are set in a mold and then a semi-rigid polyurethane foam raw solution is injected into the mold, followed by curing. As a method for producing a crash pad made from a semi-rigid polyurethane foam, the production method as disclosed in Patent Document 1 has been known.

However, the above-described production method has the problem that a curing time is long and moldability is insufficient. On the other hand, in the production method as disclosed in Patent Document 2, for example, curability and moldability can be improved to enhance productivity by using a polyol component comprising a polyol having a specific structure, a specific isocyanate component and a specific catalyst in combination.

In recent years, the improvement toward lightweights has been strongly demanded in order to enhance fuel economy, and a reduction in thickness in interior materials such as a crash pad has also been demanded. However, the above-described production method also has the problem that moldability is deteriorated when the thicknesses of such interior materials are reduced, in addition to the above-described problem.

In addition, in recent years, almost popular-priced automobiles are demanded to have high added values like luxury automobiles. For example, interior materials made from synthetic resins have been demanded to have a soft and resilient touch feel like a leather. In the above-described production methods, when the hardness of a semi-rigid polyurethane foam is reduced to improve the modulus of repulsion elasticity of the semi-rigid polyurethane foam, it is necessary to increase the molecular weight of a polyol component. As a result, the problem that the viscosity of a foam raw solution is increased and moldability becomes poor may occur.

PRIOR ART DOCUMENT

Patent Documents

Patent Document 1: JP-B-4-146916
Patent Document 2: JP-A-2001-354746

SUMMARY OF THE INVENTION

Problems to be Solved by the Invention

An object of the present invention is to provide a composition for forming a semi-rigid polyurethane foam suitable as an automotive interior material, in which when the composition is formed into a semi-rigid polyurethane foam, the foam has low hardness and a resilient feel and has excellent moldability and curability even when the foam is made lightweight (made thin).

Solutions to the Problems

The present inventor has made intensive studies for the purpose of achieving the object. As a result, the present inventor has found that excellent moldability and curability can be achieved by using a composition for forming a semi-rigid polyurethane foam which contains a specific polyol (composition), and the present invention has been accomplished.

That is, the present invention provides: a composition for forming a semi-rigid polyurethane foam, comprising a polyol mixture (P) containing a polyol (composition) (A) mentioned below, a water-containing foaming agent (C) and a catalyst (D) and a polyisocyanate component (B), wherein a content of the foaming agent (C) is 1.5 to 2.5% by weight based on a total weight of (A); a method for producing a semi-rigid polyurethane foam that is formed from a polyol mixture (P) containing a polyol (composition) (A) mentioned below, a water-containing foaming agent (C) and a catalyst (D) and a polyisocyanate component (B), the method comprising a step of adjusting a cream time to 3 to 5 seconds, a step of adjusting a gel time to 15 to 25 seconds and a step of adjusting a rise time to 25 to 40 seconds when a mixed liquid of (P) and (B) is foamed and cured at a liquid temperature of 25° C.; and a semi-rigid polyurethane foam obtained by the above-described production method, wherein the semi-rigid polyurethane foam has a C hardness of 8 to 20 and a modulus of repulsion elasticity of 28 to 35% when the mixed liquid is injected into a crash pad mold and then foamed and cured in the mold at a density of 0.20 to 0.25 g/cm$^3$:

a polyol (composition) (A): a polyol (composition) containing a polymer polyol (A1) obtained by polymerizing a vinyl monomer in a polyether polyol (a) in the presence of a radical polymerization initiator and/or a polyether polyol (A2), wherein a content of a polymer of the vinyl monomer is 0 to 7% by weight based on a total weight of (A), (A2) contains a polyether polyol (A21) mentioned below, and a content of (A21) is 50 to 100% by weight based on a total weight of the polyether polyols in the polyol (composition) (A); and a polyether polyol (A21): a polyether polyol which is a polyoxyethylene polyoxypropylene polyol and has an average number of functional groups of 7.8 to 8.2, a hydroxyl value of 20 to 50 (mgKOH/g), a content of a terminal oxyethylene unit of 5 to 25% by weight and a total content of an oxyethylene unit of 8 to 30% by weight.

Effects of the Invention

The composition for forming a semi-rigid polyurethane foam according to the present invention has excellent moldability and curability when formed into a foam having a reduced thickness, and a semi-rigid polyurethane foam obtained by molding the composition has a soft texture, a resilient feel, and an excellent feel upon touch.

MODE FOR CARRYING OUT THE INVENTION

A polyol (composition) (A) to be used in a composition for forming a semi-rigid polyurethane foam according to the present invention contains a polymer polyol (A1) obtained by polymerizing a vinyl monomer in a polyether polyol (a) in the presence of a radical polymerization initiator and/or a polyether polyol (A2), wherein a content of a polymer of the vinyl monomer is 0 to 7% by weight based on a total weight of (A), (A2) contains a polyether polyol (A21) mentioned below, and a content of (A21) is 50 to 100% by weight based on a total weight of the polyether polyols in the polyol (composition) (A); and a polyether polyol (A21): a polyether polyol which is a polyoxyethylene polyoxypropylene polyol and has an average number of functional groups of 7.8 to 8.2, a hydroxyl value of 20 to 50 (mgKOH/g), a content of a terminal oxyethylene unit of 5 to 25% by weight and a total content of an oxyethylene unit of 8 to 30% by weight.

In the present invention, the polyol (composition) (A) may be a single polyol or a mixture of two or more polyols.

The polyol (composition) (A) in the present invention may be the polymer polyol (A1) alone, the polyether polyol (A2) alone, or a mixture of (A1) and (A2). From the viewpoint of the liquid flowability of the foam, (A2) alone and the mixture of (A1) and (A2) are preferred, and the mixture of (A1) and (A2) is more preferred.

Examples of the polyether polyols (a) and (A2) include ethylene oxide (abbreviated as EO, hereinbelow) and 1,2-propylene oxide (abbreviated as PO, hereinbelow) adducts of compounds containing 2 to 8 or more active hydrogen atoms (a polyhydric alcohol, a polyhydric phenol and an amine), and the like. Two or more of them may be used in combination.

Examples of the polyhydric alcohol include dihydric alcohols having 2 to 12 carbon atoms [ethylene glycol, diethylene glycol, 1,2- and 1,3-propylene glycol, dipropylene glycol, 1,3- and 1,4-butanediol, 1,6-hexanediol, neopentyl glycol, cyclohexanediol and cyclohexanedimethanol, etc.], alcohols having a valency of 3 to 8 or more and having 3 to 12 carbon atoms [glycerol, trimethylolpropane, pentaerythritol, diglycerol, α-methyl glucoside, sorbitol, xylitol, mannitol, glucose, fructose and sucrose, etc.] and combinations of two or more of them.

Examples of the polyhydric phenol include monocyclic polyhydric phenols (pyrogallol and hydroquinone, etc.), bisphenols (bisphenol A, bisphenol F and bisphenol sulfone, etc.), lower condensates of phenol compounds (phenol and cresol, etc.) with formalin (intermediates for novolac resin and resol resin) and combinations of two or more of them.

The amine includes an amine having 2 to 8 or more active hydrogen atoms, and examples of the amine include ammonia; alkanolamines [monoethanolamine, diethanolamine, triethanolamine, isopropanolamine and aminoethylethanolamine, etc.]; alkylamines having 1 to 20 carbon atoms [methylamine, ethylamine, n-butylamine and octylamine, etc.]; alkylenediamines having 2 to 6 carbon atoms [ethylenediamine and hexamethylenediamine, etc.]; polyalkylene polyamines (dialkylenetriamine to hexaalkyleneheptamine in each of which an alkylene group has 2 to 6 carbon atoms) [diethylenetriamine and triethylenetetramine, etc.]; aromatic mono- or polyamines having 6 to 20 carbon atoms [aniline, phenylenediamine, diaminotoluene, xylylenediamine, methylenedianiline and diphenylether diamine, etc.]; alicyclic amines having 4 to 15 carbon atoms [isophoronediamine and cyclohexylenediamine, etc.]; heterocyclic amines having 4 to 15 carbon atoms [aminoethylpiperazine and those described in JP-B-55-21044]; and combinations of two or more of them.

Among them, a polyhydric alcohol is preferred from the viewpoint of the hardness retention rate of the foam after thermal aging and the liquid flowability of the foam. A dihydric alcohol having 2 to 4 carbon atoms or a trihydric to octahydric alcohol having 3 to 12 carbon atoms is more preferred.

In the polyether polyols (a) and (A2), the additional method for EO and PO may be either block addition or random addition. It is preferred to carry out the addition of EO and PO by block addition. It is more preferred to add EO to a terminal and optionally to an inner moiety and then carry out the addition of EO by block addition.

The number average molecular weight of each of (a) and (A2) is preferably 3000 to 25000, more preferably 4000 to 20000, and particularly preferably 5000 to 18000, from the viewpoint of the hardness of the foam and the liquid flowability of the mixed liquid.

The % by weight of the EO to be added to each of (a) and (A2) [i.e., the content of the oxyethylene unit (abbreviated as EO unit, hereinbelow)] is preferably 5 to 40%, more preferably 8 to 35%, and particularly preferably 10 to 30% from the viewpoint of the moldability of the foam and the hardness of the foam.

The hydroxyl value (mgKOH/g) of each of (a) and (A2) is preferably 15 to 300, more preferably 20 to 50, and particularly preferably 24 to 35 from the viewpoint of the hardness of the foam and the liquid flowability of the mixed liquid.

In the present invention, the hydroxyl group value is measured in accordance with JIS K-1557-1.

In the present invention, the number average molecular weight is measured by GPC (gel permeation chromatography) under the below-described measurement conditions.

<Measurement Conditions for GPC>

Column: TSK gel SuperH4000, TSK gel SuperH3000 and TSK gel SuperH2000 (all are manufactured by Tosoh Corporation)

Column temperature: 40° C.

Detector: RI

Solvent: tetrahydrofuran

Flow rate: 0.6 ml/minute

Sample concentration: 0.25% by weight

Injection amount: 10 μl

Standard: polyoxyethylene glycol (manufactured by Tosoh Corporation; TSK STANDARDPOLYETHYLENE OXIDE)

Data processing device: SC-8020 (manufactured by Tosoh Corporation)

The average number of functional groups in each of the polyether polyols refers to an average number of hydroxyl groups contained per molecule of each of the polyether polyols. The average number of functional groups in the total of the polyether polyols (a) and (A2) in the polyol (composition) (A) is preferably 5.5 to 8, and more preferably 6 to 7.5. In the case of a mixture of multiple polyether polyols, for example, even when the number of functional groups in each of the polyether polyols is outside of the range from 5.5 to 8, the average number of functional groups is determined as 5.5 to 8 as long as the weighted average number of functional groups falls within the range from 5.5 to 8. The curability of the foam becomes good when the average number of functional groups is 5.5 or more, and the liquid flowability of the mixed liquid becomes good when the average number of functional groups is 8 or less. The average number of functional groups in each of the polyether polyols can be calculated in accordance with the following formula:

average number of functional groups=[number average molecular weight of polyether polyol]×[hydroxyl value]/56100.

The average number of functional groups in the polyether polyol (A21) contained in the polyether polyol (A2) as an essential component is 7.8 to 8.2, and preferably 7.9 to 8.1 from the viewpoint of the repulsion elasticity and liquid flowability of the foam. If the average number of functional groups is less than 7.8, the repulsion elasticity becomes low. If the average number of functional groups is more than 8.2, the liquid flowability of the foam is reduced.

The hydroxyl value (mgKOH/g) of (A21) is 20 to 50, and preferably 25 to 40 from the viewpoint of the hardness of the foam.

The total content of the EO unit in (A21) is 8 to 30% by weight based on the total weight of (A21), and preferably 10 to 20% by weight from the viewpoint of the curing time of the foam and the liquid flowability of the foam. If the total content of the EO unit in (A21) is less than 8% by weight, the curing time of the foam becomes longer. If the total content of the EO unit is more than 30% by weight, the curing time of the foam becomes shorter and therefore the liquid flowability of the foam becomes poor.

The content of the terminal EO unit in (A21) is 5 to 25% by weight, and preferably 10 to 20% by weight from the viewpoint of the curing time of the foam and the liquid flowability of the foam. If the content of the terminal EO unit in (A21) is less than 5% by weight, the curing time of the foam becomes long. If the content of the terminal EO unit in (A21) is more than 25% by weight, the curing time of the foam becomes shorter and the liquid flowability of the foam becomes poor.

The number average molecular weight of (A21) is preferably 5000 to 25000, more preferably 8000 to 20000, and particularly preferably 12000 to 18000 from the viewpoint of the hardness of the foam and the liquid flowability of the mixed liquid.

The content of the polyether polyol (A21) is 50 to 100% by weight, and preferably 70 to 100% by weight based on the total weight of the polyether polyol [(a) and/or (A2)] in the polyol (composition) (A) from the viewpoint of the repulsion elasticity of the foam. From the same viewpoint, the content of the polyether polyol (A21) is preferably 70 to 90% by weight based on the weight of the polyol (composition) (A). If the content of the polyether polyol (A21) in (A) is less than 50% by weight, the repulsion elasticity of the foam is reduced.

The polymer polyol (A1) in the present invention can be produced by polymerizing a vinyl monomer in the polyether polyol (a) in the presence of a radical polymerization initiator by a conventional manner.

Examples of the vinyl monomer include acrylonitrile, styrene, vinylidene chloride, a (C2-C5)hydroxyalkyl (meth) acrylate and a (C1-C5)alkyl (meth)acrylate, etc. Among them, acrylonitrile and styrene are preferred from the viewpoint of dispersion stability and the hardness of the foam.

The content of the polymer of the vinyl monomer is 0 to 7% by weight, preferably 0 to 6% by weight, and more preferably 1 to 6% by weight based on the total weight of (A) from the viewpoint of the hardness retention rate of the foam after thermal aging and the repulsion elasticity of the foam.

In the present invention, the radical polymerization initiator that can be used is one that generates a free radical to cause the polymerization to initiate, and examples thereof include azo compounds such as 2,2'-azabisisobutyronitrile, 2,2'-azobis(2,4-dimethylvaleronitrile) and 2,2'-azobis(2-methylbutyronitrile); organic peroxides such as dibenzoyl peroxide, dicumyl peroxide, benzoyl peroxide, lauroyl peroxide and persuccinic acid; and inorganic peroxides such as a persulfuric acid salt and a perboric acid salt. Two or more of them may be used in combination.

It is preferred that the polymer polyol (A1) contains a polymer polyol (A11) obtained by polymerizing a vinyl monomer in a polyether polyol (a1) mentioned below in the presence of a radical polymerization initiator from the viewpoint of hardness:

a polyether polyol (a1): a polyether polyol which is a polyoxyethylene polyoxypropylene polyol and has an average number of functional groups of 2.8 to 4.2, a hydroxyl value of 15 to 38 (mgKOH/g) and a total content of an EO unit of 5 to 40% by weight.

The average number of functional groups in (a1) is 2.8 to 4.2, and preferably 3.8 to 4.1.

The hydroxyl value (mgKOH/g) of (a1) is 15 to 38, and preferably 20 to 35 from the viewpoint of the hardness of the foam and the liquid flowability of the mixed liquid.

The total content (% by mass) of the EO unit in (a1) is 5 to 40%, preferably 8 to 35%, and particularly preferably 10 to 30% from the viewpoint of the moldability of the foam and the hardness of the foam.

The number average molecular weight of (a1) is preferably 3000 to 20000, more preferably 4000 to 18000, and particularly preferably 5000 to 16000 from the viewpoint of the hardness of the foam and the liquid flowability of the mixed liquid.

It is particularly preferred that the polyol (composition) (A) to be used in the present invention contains the above-described polymer polyol (A11) in addition to said polyether polyol (A21) from the viewpoint of the hardness retention rate of the foam after thermal aging, wherein the content of (A21) and that of (A11) in (A) are 70 to 90% by weight and 5 to 25% by weight, respectively.

The polyisocyanate component (B) to be used in the composition for forming a semi-rigid polyurethane foam according to the present invention may be a polyisocyanate that is generally used for the production of polyurethane. For the reasons of improvement in productivity, improvement in a working environment and the like, the polyisocyanate component (B) preferably contains one or more compounds selected from the group of diphenylmethane diisocyanate, polymethylene polyphenylene polyisocyanate and modified products thereof. Examples of the above-described modified products include urethane-modified products, carbodiimide-modified products, allophanate-modified products, urea-modified products, biuret-modified products, isocyanurate-modified products and oxazolidone-modified products, etc.

An NCO content in (B) is preferably 20 to 30% by weight, and more preferably 25 to 29% by weight from the viewpoint of the hardness and repulsion elasticity of the foam and the liquid flowability during the production of the foam.

The foaming agent (C) to be used in the composition for forming a semi-rigid polyurethane foam according to the present invention contains water as an essential component, and water alone or a combination of water with other foaming agent can be used as the foaming agent (C). From the viewpoint of moldability, it is preferred to use water alone.

Examples of other foaming agent include a liquefied carbon dioxide gas and a low-boiling compound having a boiling point of −5 to 70° C.

Examples of the low-boiling compound include a hydrogen atom-containing halogenated hydrocarbon and a low-boiling hydrocarbon, etc. Specific examples of the hydrogen atom-containing halogenated hydrocarbon and the low-boiling hydrocarbon include HCFC (hydrochlorofluorocarbon) {HCFC-123, HCFC-141b and HCFC-142b, etc.}; HFC (hydrofluorocarbon) {HFC-152a, HFC-356mff, HFC-236ea, HFC-245ca, HFC-245fa and HFC-365mfc, etc.}, butane, pentane and cyclopentane, etc.

The content of the foaming agent (C) is 1.5 to 2.5% by weight based on the weight of the polyol (composition) (A). From the viewpoint of the moldability of the foam, the content is preferably 1.6 to 2.2% by weight, and more preferably 1.7 to 2.1% by weight. If the content of (C) is less than 1.5% by weight, the liquid flowability during the production of the foam is deteriorated. If the content of (C) is more than 2.5% by weight, molding defects such as expansion of the foam occur.

The catalyst (D) to be used in the composition for forming a semi-rigid polyurethane foam according to the present invention can be a catalyst that accelerates any urethanization reaction common in the art. Examples of the catalyst (D) can include amine-type catalysts such as triethylenediamine, triethylamine, triethanolamine, bis(N,N-dimethylaminoethyl) ether, N,N-dimethylaminopropyldipropanolamine, N,N,N',N'-tetramethylhexamethylenediamine and "KAOLIZER P-200" manufactured by Kao Corporation; organic metal compounds such as a carboxylic acid metal salt and dibutyltin laurate; and carboxylic acid metal salts such as potassium acetate, potassium octylate and stannous octoate; and the like. When the above-described catalyst is used in the composition for forming a semi-rigid polyurethane foam, the condensation reaction in the polyurethane formation can be controlled in a proper state.

The amount of the catalyst (D) to be used is preferably 1.0 to 3.5% by weight, and more preferably 1.5 to 3.0% by weight based on the weight of the polyol (composition) (A) from the viewpoint of the moldability of the foam.

In the present invention, if necessary, a foam stabilizer (E) can be contained in the polyol mixture (P). The foam stabilizer (E) may be any one that can be used in the production of conventional polyurethane foams, and examples thereof include dimethyl siloxane-type foam stabilizers ["SRX-253", "PRX-607" manufactured by Dow Corning Toray Co., Ltd., etc.] and polyether-modified dimethyl siloxane-type foam stabilizers ["SZ-1142", "SRX-294A", "SH-193", "SZ-1720", "SZ-1675t", "SF-2936F" and the like manufactured by Dow Corning Toray Co., Ltd., "L-3640" and the like manufactured by Momentive Performance Materials Inc., and "B8715LF2" and the like manufactured by Degussa Japan Co., Ltd.]. The amount of the foam stabilizer to be used is preferably 0.1 to 5.0% by weight, and more preferably 0.5 to 1.0% by weight based on the weight of the polyol (composition) (A) from the viewpoint of the moldability of the polyurethane foam and the discoloration of the foam.

In the present invention, if necessary, a cross-linking agent (F) can be contained in the polyol mixture (P). The cross-linking agent (F) may be any one that can be used for the production of conventional polyurethane foams, and examples thereof include a polyhydric alcohol, a polyhydric phenol and an amine. Examples of the polyhydric alcohol include dihydric alcohols having 2 to 12 carbon atoms [ethylene glycol, diethylene glycol, propylene glycol, dipropylene glycol, 1,4-butanediol, 1,6-hexanediol, 1,3-butylene glycol, diethylene glycol and neopentyl glycol, etc.] and alcohols having a valency of 3 to 8 or more and having 3 to 12 carbon atoms [glycerol, trimethylolpropane, pentaerythritol, diglycerol, α-methyl glucoside, sorbitol, xylitol, mannitol, glucose, fructose and sucrose, etc.], and the like.

Examples of the polyhydric phenol include monocyclic polyhydric phenols (hydroquinone etc.), bisphenols (bisphenol A, bisphenol F, etc.) and lower condensates of phenol compounds (phenol and cresol, etc.) with formalin (intermediates for novolac resin and resol resin), and the like.

Examples of the amine includes alkanolamines [monoethanolamine, diethanolamine, triethanolamine, isopropanolamine and aminoethylethanolamine, etc.]; alkylamines having 1 to 20 carbon atoms [methylamine, ethylamine, n-butylamine and octylamine, etc.]; alkylenediamines having 2 to 6 carbon atoms [ethylenediamine and hexamethylenediamine, etc.]; polyalkylene polyamines (dialkylenetriamine to hexaalkyleneheptamine in each of which an alkylene group has 2 to 6 carbon atoms) [diethylenetriamine and triethylenetetramine, etc.]; aromatic mono- or polyamines having 6 to 20 carbon atoms [aniline, phenylenediamine, diaminotoluene, xylylenediamine, methylenedianiline and diphenylether diamine, etc.]; alicyclic amines having 4 to 15 carbon atoms [isophoronediamine and cyclohexylenediamine, etc.]; heterocyclic amines having 4 to 15 carbon atoms [aminoethylpiperazine and those described in JP-B-55-21044, etc.]; combinations of two or more of them, and the like.

From the viewpoint of the curability of the foam, an amine is preferred.

In the present invention, if necessary, conventionally known additives and aids can be used in the polyol mixture (P), including anti-aging agents such as antioxidant agents (hindered phenol and hindered amine, etc.) and ultraviolet ray absorbers (triazole and benzophenone, etc.); fillers such as inorganic salts (calcium carbonate and barium sulfate, etc.), inorganic fibers (glass fibers and carbon fibers, etc.) and whiskers (potassium titanate whiskers, etc.); flame retardant agents (phosphoric acid ester, etc.); adhesive agents (modified polycaprolactone polyol, etc.); plasticizers (phthalic acid esters, etc.); coloring agents (dye and pigment); antibacterial agents; anti-fungal agents; and the like.

In the composition for forming a semi-rigid polyurethane foam according to the present invention, the isocyanate index [(NCO group/active hydrogen atom-containing groups) equivalent ratio×100] of a mixed liquid composed of the polyol mixture (P) and the polyisocyanate component (B) is preferably 70 to 140, more preferably 75 to 130, and particularly preferably 80 to 120 from the viewpoint of the curability of the foam and the moldability of the foam.

The composition for forming a semi-rigid polyurethane foam according to the present invention can be used for the production of a semi-rigid polyurethane foam such as an automotive interior material. From the viewpoint of achieving the effect of the present invention, it is preferred that the composition for forming a semi-rigid polyurethane foam according to the present invention is used in the method for producing a crash pad for a vehicle instrument panel, the method including a step of injecting the composition into a crash pad mold and then foaming and curing the composition.

One example of the production of a polyurethane foam using the composition for forming a semi-rigid polyurethane foam according to the present invention is as follows. First, predetermined amounts of the polyol (composition) (A), the foaming agent (C) and the catalyst (D) as well as optionally the other additive or aid are mixed together to prepare the polyol mixture (P).

Subsequently, the polyol mixture (P) is quickly mixed with the polyisocyanate component (B) with a polyurethane foaming machine (low-pressure or high-pressure foaming machine, preferably high-pressure foaming machine) or a stirrer. The resulting mixed liquid is injected into a close injection type-crash pad mold (preferably having a mold temperature of 25 to 50° C.) in which a skin and a base material are set respectively on both surfaces thereof, foamed and cured in the mold, and then demolded after a predetermined period of time to obtain a semi-rigid polyurethane foam having a uniform density distribution. The additive, the aid or the like may be mixed with the polyisocyanate component (B) upon use. The filling rate during the injection [(density during mold foaming/density during free foaming)×100] is preferably 100 to 400%, and particularly preferably 150 to 350%.

The method for producing a semi-rigid polyurethane foam according to the present invention includes a step of adjusting a cream time to 3 to 5 seconds, a step of adjusting a gel time to 15 to 25 seconds and a step of adjusting a rise time to 25 to 40 seconds when the mixed liquid of the polyol mixture (P) and the polyisocyanate component (B) is foamed and cured at a liquid temperature of 25° C.

According to the production method of the present invention, good liquid flowability can be achieved during molding.

In the production method according to the present invention, for adjusting the cream time, the gel time and the rise time, for example, the amount of the catalyst (D) to be used should be adjusted. For promoting the cream time and the rise time, the amount of an amine-type catalyst, preferably bis(N,N-dimethylaminoethyl) ether or N,N-dimethylaminopropyldipropanolamine to be used should be increased. For promoting the gel time, the amount of an amine-type catalyst and/or an organic metal compound, preferably a tertiary amine catalyst ["KAOLIZER P-200" manufactured by Kao Corporation, triethylenediamine, etc.] to be used should be increased.

In the production method according to the present invention, it is preferred that the method additionally includes a step of adjusting the curing time to within 60 seconds when the mixture liquid is foamed and cured at a liquid temperature of 25° C. in a crash pad mold having a temperature of 40° C.

The term "curing time" refers to a time between a time point at which the injection of the raw material (the composition for forming a polyurethane foam) into the mold under the same conditions as those employed for said cream time starts and a time point at which the mold is opened. If the opening of the mold is carried out in such a state where the curing is insufficient, the crash pad might be deformed.

In the production method according to the present invention, for adjusting the curing time, for example, the amount of the catalyst (D) to be used should be adjusted. For promoting the curing time, the amount of an amine-type catalyst and or an organic metal compound, preferably a tertiary amine catalyst ["KAOLIZER P-200" manufactured by Kao Corporation, triethylenediamine, etc.] to be used should be increased.

Even when it is confirmed that the cream time, the gel time, the rise time and the curing time respectively fall with the above-described ranges and there is no need to prolong or shorten each of the times, the confirmation of each of the times is deemed to have the adjustment step.

When the semi-rigid polyurethane foam, which is obtained by using the composition for forming a semi-rigid polyurethane foam according to the present invention and by injecting the composition into a crash pad mold and then molding the composition under the above-described conditions, is foamed and cured so as to have a density of 0.20 to 0.25 g/cm$^3$, the polyurethane foam has a C hardness of 8 to 20 (preferably 8 to 16) and a modulus of repulsion elasticity of 28 to 35% (preferably 29 to 33%).

EXAMPLES

Hereinbelow, the present invention will be described more in detail by way of examples. However, the present invention is not limited thereby. Hereinbelow, part(s) and % refer to parts) by weight and % by weight, respectively, unless otherwise specified.

Examples 1 to 14 and Comparative Examples 1 to 5

A polyol mixture (P) and a polyisocyanate component (B) shown in Tables 1 and 2 were mixed together with a high-pressure foaming machine (MiniRIM machine, manufactured by PEC), and the resulting mixture was injected into a metal closed mold having a size of 100×1200×6.8 mm for molding. In the mold, a polyurethane skin having a thickness of 0.8 mm and a polypropylene base material having a thickness of 3 mm were set in advance on both surfaces of the mold, respectively. The molding conditions are as follows.

<Molding Conditions>
Liquid temperature: (P)/(B)=25° C./25° C.
Mold temperature: 40° C.
Curing time: 60 seconds The measurement results of the moldability and physical properties of each of the foams thus obtained are shown in Tables 1 and 2.

In Tables 1 and 2, the charge amount of each material used is shown by part(s) by weight. The charge amount of each polyisocyanate component is shown by isocyanate index.

TABLE 1

| | | | Examples | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Polyol mixture (P) | Polyol (composition) (A) | (A21-1) | 100 | 50 | 80 | 75 | 100 | 100 | 100 | 95 | 100 | 100 | 100 | 70 | 75 | 75 |
| | | (A2-2) | | | | 12 | | | | | | | | 20 | 12 | 12 |
| | | (A2-5) [(a1-1)] | | 50 | | | | | | | | | | | | |
| | | (A2-4) | | | | | | | | 5 | | | | | | |
| | | A11-1) | | | 20 | 13 | | | | | | | | 10 | 13 | 13 |
| | Faoming agent (C) | Water | 2.0 | 2.0 | 2.0 | 2.0 | 1.5 | 2.5 | 2.0 | 2.0 | 2.0 | 2.0 | 2.0 | 2.0 | 1.5 | 2.5 |
| | Catalyst (D) | (D-1) | 2.0 | 2.2 | 2.0 | 2.0 | 2.0 | 2.0 | 2.0 | 2.0 | 1.7 | 2.2 | 2.2 | 2.0 | 2.0 | 2.0 |
| | | (D-2) | 0.5 | 0.5 | 0.5 | 0.5 | 0.5 | 0.4 | 0.5 | 0.5 | | 0.6 | 0.6 | 0.5 | 0.5 | 0.5 |
| | | (D-3) | | | | | | | | | 0.6 | | | | | |

TABLE 1-continued

|  |  | Examples | | | | | | | | | | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 | 14 |
| Foam stabilizer (E-1) (E) | | 0.5 | 0.5 | 0.5 | 0.5 | 0.5 | 0.5 | 0.5 | 0.5 | 0.5 | 0.5 | 0.5 | 0.5 | 0.5 | 0.5 |
| Cross-linking agent (F) | (F-1) |  |  |  |  |  |  | 0.5 | 1.0 |  |  |  |  |  |  |
| <Average number of functional groups in total of (a) and (A2) in (A)> | | 8.0 | 5.3 | 7.0 | 6.0 | 8.0 | 8.0 | 8.0 | 5.1 | 8.0 | 8.0 | 8.0 | 5.5 | 6.0 | 6.0 |
| <Content of polymer in (A) (%)> | | 0 | 0 | 6 | 4 | 0 | 0 | 0 | 0 | 0 | 0 | 0 | 3 | 4 | 4 |
| Polyisocyanate component (B) | (B-1) (Index) | 100 | 100 | 100 | 100 | 100 | 100 | 100 | 100 | 100 |  |  | 100 | 100 | 100 |
|  | (B-2) (Index) |  |  |  |  |  |  |  |  |  | 100 |  |  |  |  |
|  | (B-3) (Index) |  |  |  |  |  |  |  |  |  |  | 100 |  |  |  |
| <Reactivity (sec)> | Cream time | 3 | 3 | 3 | 3 | 5 | 3 | 3 | 4 | 3 | 5 | 5 | 4 | 5 | 3 |
|  | Gel time | 21 | 23 | 22 | 21 | 25 | 20 | 20 | 21 | 20 | 23 | 23 | 22 | 25 | 20 |
|  | Rise time | 27 | 29 | 27 | 27 | 33 | 33 | 25 | 27 | 25 | 33 | 33 | 29 | 33 | 33 |
| <Moldability> | Liquid flowability | ○ | ○ | ○ | ○ | ○ | ○ | ○ | ○ | ○ | Δ | Δ | ○ | Δ | ○ |
|  | Curability | ◎ | ○ | ◎ | ◎ | ◎ | ◎ | ◎ | ○ | ◎ | ◎ | ◎ | ○ | ◎ | ◎ |
| <Physical properties of foam> | Whole density (g/cm3) | 0.22 | 0.22 | 0.22 | 0.22 | 0.22 | 0.22 | 0.22 | 0.22 | 0.22 | 0.22 | 0.22 | 0.22 | 0.22 | 0.22 |
|  | C hardness | 10 | 10 | 10 | 10 | 8 | 14 | 11 | 12 | 11 | 16 | 15 | 10 | 8 | 14 |
|  | C hardness retention rate after thermal aging (%) | 60 | 60 | 90 | 90 | 63 | 64 | 55 | 58 | 55 | 63 | 60 | 80 | 88 | 86 |
|  | Repulsion elasticity (%) | 32 | 30 | 31 | 32 | 33 | 29 | 31 | 31 | 31 | 28 | 28 | 30 | 33 | 29 |
|  | Tensile strength (Mpa) | 0.45 | 0.44 | 0.43 | 0.44 | 0.27 | 0.60 | 0.50 | 0.50 | 0.50 | 0.70 | 0.68 | 0.42 | 0.30 | 0.60 |
|  | Elongation rate (%) | 80 | 84 | 80 | 88 | 85 | 80 | 75 | 75 | 70 | 60 | 65 | 80 | 90 | 85 |

TABLE 2

|  |  |  | Comparative Examples | | | | |
| --- | --- | --- | --- | --- | --- | --- | --- |
|  |  |  | 1 | 2 | 3 | 4 | 5 |
| Polyol mixture (P) | Polyol (composition) (A) | (A21-1) | 40 | 70 |  | 100 | 100 |
|  |  | (A2-2) | 60 |  |  |  |  |
|  |  | (A2-3) |  |  | 100 |  |  |
|  |  | (A11-1) |  | 30 |  |  |  |
|  | Faoming agent (C) | Water | 2.0 | 2.0 | 2.0 | 1.3 | 2.7 |
|  | Catalyst (D) | (D-1) | 2.0 | 2.0 | 4.0 | 2.2 | 2.0 |
|  |  | (D-2) | 0.5 | 0.5 | 1.0 | 0.6 | 0.5 |
|  | Foam stabilizer (E) | (E-1) | 0.5 | 0.5 | 0.5 | 0.5 | 0.5 |
| Polyisocyanate component (B) | (B-1) (Index) | | 100 | 100 | 100 | 100 | 100 |
| <Average number of functional groups in total of (a) and (A2) in (A)> | | | 3.9 | 6.5 | 3.0 | 8.0 | 8.0 |
| <Content of polymer in (A) (%)> | | | 0 | 9 | 0 | 0 | 0 |
| <Reactivity (sec)> | Cream time | | 3 | 3 | 7 | 5 | 3 |
|  | Gel time | | 23 | 22 | 25 | 25 | 25 |
|  | Rise time | | 27 | 27 | 40 | 33 | 40 |
| <Moldability> | Liquid flowability | | ○ | Δ | ○ | X | Δ |
|  | Curability | | Δ | ○ | X | ◎ | Δ |
| <Physical properties of foam> | Whole density (g/cm3) | | 0.22 | 0.22 | 0.22 | 0.25 | 0.22 |
|  | C hardness | | 10 | 11 | 8 | 10 | 13 |
|  | C hardness retention rate after thermal aging (%) | | 55 | 84 | 50 | 63 | 60 |
|  | Repulsion elasticity (%) | | 25 | 25 | 26 | 33 | 31 |
|  | Tensile strength (Mpa) | | 0.45 | 0.47 | 0.40 | 0.20 | 0.68 |
|  | Elongation rate (%) | | 85 | 75 | 90 | 80 | 90 |

The components shown in Tables 1 and 2 are as follows.

(A21-1): block adduct in which PO and EO are added in this order to sucrose (hydroxyl value: 28, content of terminal EO unit=20%, average number of functional groups=8.0).

(A2-2): block adduct in which PO and EO are added in this order to glycerol (hydroxyl value 34, content of terminal EO unit=20%, average number of functional groups=3.0).

(A2-3): PO adduct of glycerol (hydroxyl value 34, average number of functional groups=3.0).

(A2-4): block adduct in which PO and EO are added in this order to glycerol (hydroxyl value 280, content of terminal EO unit=10%, average number of functional groups=3.0).

(A2-5) [(a1-1)]: block adduct in which PO and EO are added in this order to pentaerythritol (hydroxyl value 28, content of terminal EO unit=14%, average number of functional groups=4.0).

(A11-1): polymer polyol obtained by copolymerizing acrylonitrile and styrene in the polyol (a1-1) (polymer content: 30%, an acrylonitrile/styrene ratio (by weight)=65/35).

(B-1): modified MDI ["CEF-263", manufactured by Nippon Polyurethane Industry Co., Ltd., NCO content=28.7%].

(B-2): modified MDI ["CEI-264", manufactured by Nippon Polyurethane Industry Co., Ltd., NCO content=30.4%].

(B-3): polymeric MDI ["MR-200", manufactured by Nippon Polyurethane Industry Co., Ltd., NCO content=31.3%].

(D-1): tertiary amine catalyst ["KAOLIZER P-200", manufactured by Kao Corporation].

(D-2): 70% solution of bis(N,N-dimethylamino-2-ethyl) ether in diethylene glycol ["TOYOCAT-ET", manufactured by Tosoh Corporation].

(D-3): polyurethane catalyst ["DABCO NE300", manufactured by AIR PRODUCTS Japan, Inc.].

(E-1): organic modified polysiloxane mix ["Tegostab B8715LF2", manufactured by Degussa Japan Co., Ltd.].

(F-1): triethanolamine.

The methods for evaluating reactivity are as follows.

Cream time: a time (second(s)) between a time point at which raw materials [polyol mixture (P) and polyisocyanate component (B)] are injected and a time point at which foaming starts when the raw materials are free-foamed in a wood box having a size of 20 cm×20 cm×30 cm at a liquid temperature of the raw materials immediately before urethanization reaction of 25° C. in the urethanization reaction.

Gel time: a (resin formation) time (second(s)) between a time point at which mixing of the polyol mixture (P) with the polyisocyanate component (B) starts and a time point at which the mixture begins to become thick to develop gel strength.

Rise time: a time (second(s)) between a time point at which mixing of the polyol mixture (P) with the polyisocyanate component (B) starts and a time point at which an increase in an expanded foam is terminated.

The methods for evaluating moldability in Tables 1 and 2 are as follows.

Liquid flowability: the appearance of the foam that was demolded from the mold was confirmed and was rated in accordance with the following criteria.

x: underfill portion is present

Δ: voids or deformed cells are present at end part of molded product.

○: no void or deformed cell is present at end part of molded product.

Curability: the foam was removed from the mold, then a load of 5 kg was applied to the foam for 3 seconds, and then the degree of deformation of the foam was confirmed and rated in accordance with the following criteria.

x: deformation of 5 mm or more is observed.

Δ: deformation of 1 mm or more and less than 5 mm is observed.

○: deformation of less than 1 mm is observed.

⊙: deformation is not observed.

The methods for evaluating physical properties of a foam are as follows.

Whole density (g/cm$^3$): JIS K6401 (whole density refers to "apparent density" as defined in the JIS standard).

C hardness: C hardness was measured with Shore C hardness meter.

C hardness retention rate after thermal aging (%): 100×[C hardness after retained at 130° C. for 100 hours]/[initial C hardness]

Repulsion elasticity (%): JIS K6401 (foams are overlaid to increase thickness to 30 mm).

Tensile strength (MPa): JIS K6401

Rate of elongation (%): JIS K6401

The compositions for forming a semi-rigid polyurethane foam of Examples 1 to 14 have superior liquid flowability and curability compared with those of Comparative Examples 1 to 5 in each of which the amounts of the polyol (composition) and the foaming agent were changed. Semi-rigid polyurethane foams obtained by molding the compositions of Examples 1 to 14 have a soft texture, a resilient feel, and an excellent feel upon touch.

INDUSTRIAL APPLICABILITY

An automotive interior material produced using the composition for forming a semi-rigid polyurethane foam according to the present invention has superior curability and moldability compared with an automotive interior material produced using a composition through a conventional method, and also has a soft texture, a resilient feel, and an excellent feel upon touch. Therefore, the composition of the invention can exhibit significant usefulness when formed into an automotive interior material.

The invention claimed is:

1. A composition for forming a semi-rigid polyurethane foam, comprising:
   a polyol mixture (P) containing a polyol composition (A),
   water serving as a foaming agent (C),
   a catalyst (D), and
   a polyisocyanate component (B),
   wherein a content of the foaming agent (C) is 1.5 to 2.2% by weight based on a total weight of (A):
   wherein said polyol composition (A) comprises:
      a polyether polyol (A2), and
      a polymer polyol (A1) obtained by polymerizing a vinyl monomer in a polyether polyol (a) in the presence of a radical polymerization initiator, wherein a content of a polymer of the vinyl monomer is 1 to 7% by weight based on a total weight of (A),
   wherein said polyether polyol (A2) contains a polyether polyol (A21), at a content of (A21) at least 50% by weight based on a total weight of all polyether polyols in the polyol composition (A); and
   wherein said polyether polyol (A21) is a polyether polyol which is a polyoxyethylene polyoxypropylene polyol and has an average number of functional groups of 7.8 to 8.2, a hydroxyl value of 20 to 50 mgKOH/g, a content of a terminal oxyethylene units of 5 to 25% by weight and a total content of an oxyethylene units of 8 to 30% by weight,
   wherein an NCO content in (B) is 20 to 30% by weight,
   wherein a weighted average number of functional groups of the polyether polyol (A2) and the polyether polyol (a) in the polyol composition (A) is 6 to 8.

2. The composition for forming a semi-rigid polyurethane foam according to claim 1, wherein a content of (A21) is 70 to 90% by weight in (A) and a content of (A1) is 5 to 25% by weight in (A), wherein the polyether polyol (a) is a polyether polyol which is a polyoxyethylene polyoxypropylene polyol and has an average number of functional groups of 2.8 to 4.2, a hydroxyl value of 15 to 38 mgKOH/g and a total content of an oxyethylene units of 5 to 40% by weight.

3. The composition for forming a semi-rigid polyurethane foam according to claim 1, wherein the polyisocyanate component (B) contains one or more components selected from the group consisting of diphenylmethane diisocyanate, polymethylene polyphenylene polyisocyanate and modified products thereof such that the NCO content in (B) is 20 to 30% by weight.

4. The composition for forming a semi-rigid polyurethane foam according to claim 1, wherein a content of the foaming agent (C) is 1.6 to 2.2% by weight based on a total weight of (A).

5. The composition for forming a semi-rigid polyurethane foam according to claim 1, wherein a semi-rigid polyurethane foam obtained by curing the composition has a density of 0.20 to 0.25 g/cm$^3$, a C hardness of 8 to 20 and a modulus of repulsion elasticity of 28 to 35%.

6. The composition for forming a semi-rigid polyurethane foam according to claim 1, wherein a C hardness retention rate after thermal aging at 130° C. for 100 hours of a semi-rigid polyurethane foam obtained by curing the composition is from 86% to 90%, wherein the C hardness retention rate is a value calculated by the following equation:

$$100 \times [\text{C hardness of the semi-rigid polyurethane foam after the thermal aging}]/[\text{initial C hardness of the semi-rigid polyurethane foam}].$$

7. The composition for forming a semi-rigid polyurethane foam according to claim 6, wherein the C hardness retention rate after the thermal aging is from 88% to 90%.

* * * * *